Nov. 21, 1944. H. J. MURPHY Re. 22,564

WIRING AND THE LIKE CLIP DEVICE

Original Filed June 26, 1942

Inventor:
Howard J. Murphy.
By Walter S. Jones
Att'y.

Reissued Nov. 21, 1944

Re. 22,564

UNITED STATES PATENT OFFICE 22,564

WIRING AND THE LIKE CLIP DEVICE

Howard J. Murphy, Greenwood, Mass., assignor to United-Carr Fastener Corporation, Cambridge, Mass., a corporation of Massachusetts Original No. 2,340,249, dated January 25, 1944, Serial No. 448,694, June 26, 1942. Application for reissue February 4, 1944, Serial No. 521,131

17 Claims. (Cl. 24—73)

The present invention relates to strand-retainers and the like, and more particularly to retainers for holding a plurality of strands, for example electrical conductors, in secure grouped relationship, and aims generally to improve and simplify the construction of existing devices for that purpose.

Among the primary objects of the invention is the provision of an improved retainer readily formed from a single piece of sheet metal and which may be mounted in snap fastener engagement with an apertured support.

Illustrative of the invention, reference is made to the accompanying drawing showing a preferred embodiment of the invention, and in which Fig. 1 is a top plan view of a strand or wire retainer according to the invention;

Figure 1:
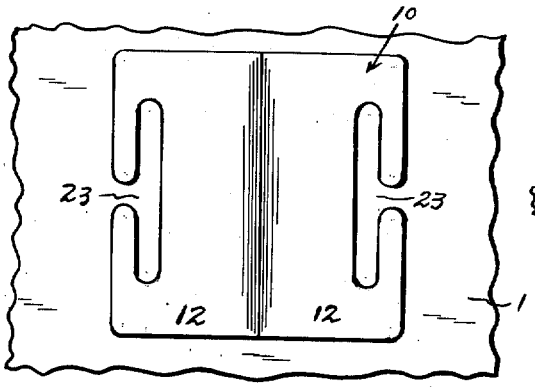

Referring to the illustrated embodiment shown in the drawing, the invention comprises a retainer formed with opposed channel-shaped receiving portions separated by a central web, which is provided with integral snap fastener means for attaching the retainer to an apertured support, the web having an elastic band or strap secured thereto for embracing a plurality of strands under tension.

Referring more particularly to the drawing, the retainer may advantageously be formed of a single strip of sheet metal, the opposite end portions of which are shaped to channel form, as at 10, presenting a web 11 and upper and base flanges 12 and 13, respectively. The two channel-shaped portions 10 are preferably connected together by an intermediate strip 14 of less width so that the lower flanges 13 may be disposed on opposite sides of the strip 14. The strip 14 is bent on itself to provide a nose portion 15 with sides connecting the nose and web portions 11, said sides having divergent portions 16 and convergent portions 17 presenting an outward bow or bulge 18 spaced below the flanges 13.

The intermediate or connecting portion thus formed provides a snap fastener means for readily attaching the retainer to a support 1 which is formed with an aperture 2. As will be apparent from Fig. 2, the nose portion 15 provides a ready means for forcing the snap fastener portion through the aperture of the support, and, when the retainer is in its fully affixed position, the opposite faces of the support 1 are engaged by the base flanges 13 and bowed portions 18. Preferably the lower flanges 13 are downwardly inclined as shown, so that the ends or feet portions thereof engage the adjacent surface of the support in planes spaced beyond the bowed portions 18, thus providing a tensional gripping effect between the ends and bowed portions.

An elastic strap or band 20 is suitably connected to one of the web portions 11 and preferably the web portions 11 are formed with elongated slots 22 through which an end of the band 20 may be inserted. The other end of the band may be formed with a stop 21 formed in any suitable way, as by a thickened part of the band 20, to prevent the band from being pulled entirely through the slots 22.

The end portions of the upper flanges may be formed with suitable fastening means for the band, and conveniently these fastening means 23 may be in the form of open-sided or T-slots into which an intermediate part of the stretched band 20 may be hooked.

Figure 2:
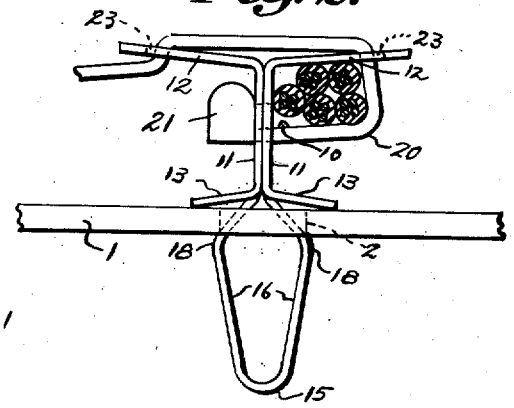
Fig. 2 is an edge elevation illustrating the retainer mounted on a support.
Figure 3:
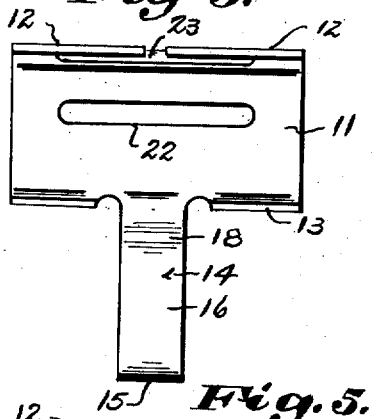
Fig. 3 is a side elevation of the retainer per se.
Figure 4:
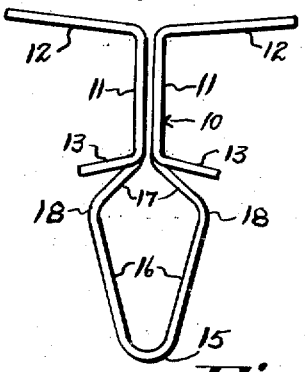
Fig. 4 is an edge elevation thereof.
Figure 5:
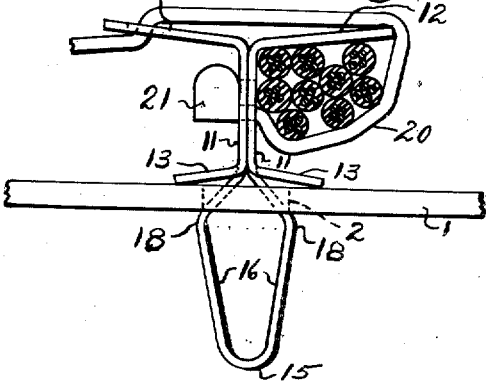
Figs. 5 and 6 are views similar to Fig. 2 illustrating alternative modes of grouping a plurality of conductors in the retainer.

In use, the retainer is snapped into position on an apertured support, as above described, and the elastic band 20 is drawn through the slot 22 until the stop 21 engages the opposite webs 11. A group of strands, such as electrical conductors, may be assembled in one of the channels 10 and the elastic band thus stretched and extended around the group of strands to engage them under tension. An intermediate portion of the band may be hooked in each of the T-slots, as shown in Figs. 2 and 6, or may be passed around the end of the upper flange 12 of the receiving channel and hooked into the opposite slot 23, as shown in Fig. 6.

Figure 6:
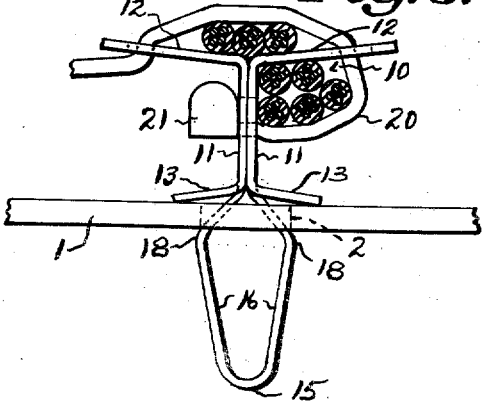

The upper flanges 12 may be upwardly sloping so as to present a valley in which an additional group of conductors may be retained as shown in Fig. 6.

The invention provides an efficient retainer of extremely simple construction which will effectively hold one or more separated groups of strands in secure position. It will be clear that the strap is reversible in the web portions 11 so that a group of strands may be positioned in either channel 10.

While I have illustrated and described a preferred embodiment of my invention, I do not wish to be limited thereby, because the scope of my invention is best defined by the following claims.

I claim:

1. A strand-retainer comprising opposed channel-shaped strand-receiving portions having an intermediate web, fastener means formed as a continuation of the web and extending below said channel-receiving portion, an elastic strap secured at one end to said web, said retainer having a strap-receiving opening in another part thereof, said strap being stretchable to embrace a plurality of strands grouped in one of said channels to hold said strands in place, and an intermediate portion of the strap being hooked into said strap-receiving opening.

2. A strand-retainer comprising opposed channel-shaped strand-receiving portions, each having upper and lower flanges and an intermediate web portion, snap fastener means formed as a continuation of the web and extending below said channel-receiving portion, an elastic strap secured at one end to said web, said retainer having a strap-receiving opening in another part thereof, said strap being stretchable to embrace a plurality of strands grouped in one of said channels to hold said strands in place, and an intermediate portion of the strap being hooked into said strap-receiving opening.

3. A strand-retainer comprising opposed channel-shaped strand-receiving portions, each having upper and lower flanges and an intermediate web portion, snap fastener means formed as a continuation of the web and extending below said channel-receiving portion, each of said web portions being formed with an elongated slot, an elastic strap extending through said slots, and at least one of the upper flanges having a strap-receiving opening, said strap being stretchable to embrace a plurality of strands grouped in one of said channels and holding said strands in place, and an intermediate portion of said strap being hooked into said strap-receiving opening.

4. A strand-retainer formed of a single piece of sheet metal bent intermediate its ends to provide a U-shaped snap fastener means for attaching said retainer to an apertured support, a strand-receiving channel connected to at least one leg of said U-shaped fastener means, said receiving channel comprising a web portion formed as a continuation of said fastener leg and an upper flange portion extending angularly thereto, a base flange extending angularly from said web on opposite sides of said fastener leg, said strand-receiving channel being adapted to receive a plurality of strands therein, and an elastic band secured at one end to said retainer for engaging said grouped strands under tension, and means for locking an intermediate portion of said band to hold it in tensioned engagement with said strands.

5. A strand-retainer formed of a single piece of sheet metal bent intermediate its ends to provide a U-shaped snap fastener means for attaching said retainer to an apertured support, a strand-receiving channel connected to at least one leg of said U-shaped fastener means, said receiving channel comprising a web portion formed as a continuation of said fastener leg and an upper flange portion extending angularly thereto, a base flange extending angularly from said web on opposite sides of said fastener leg, said strand-receiving channel being adapted to receive a plurality of strands therein, said upper flange being formed with a T-slot near its outer edge, an elastic band secured at one end to another portion of said channel spaced from said T-slot, said strap being stretchable to engage said grouped strands under tension between its attached end and the T-slot in which it is secured.

6. A strand-retainer formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said upper flanges being formed with T-slots near their terminal edges, and an elastic strip anchored in said web slots and adapted to embrace a plurality of strands grouped in at least one of said channels, a portion of the strap beyond said strands being hooked in a T-slot for retaining the strap in tensioned engagement with said strands.

7. A strand-retainer formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said base flanges engaging said support at their ends and cooperating with said U-shaped fastener means to securely hold said retainer in position on said support, said web portions being formed with aligned slots and said upper flanges being formed with T-slots near their terminal edges, and an elastic strap anchored in said web slots and adapted to embrace a plurality of strands grouped in at least one of said channels, a portion of the strap beyond said strands being hooked in a T-slot for retaining the strap in tensioned engagement with said strands.

8. A strand-retainer formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said web portions being formed with aligned slots, and said upper flanges being formed with T-slots near their terminal edges, and an elastic strap insertable through said web slots and adapted to embrace a plurality of strands grouped in at least one of said channels, a portion of the strap beyond said strands being hooked in a T-slot for retaining the strap in tensioned engagement with said strands.

9. A strand-retainer formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said web portions being formed with aligned slots, and said upper flanges being formed with T-slots near their terminal edges, and an elastic strap anchored in said web slots and adapted to embrace a plurality of strands grouped in at least one of said channels and on the outer surface of said upper flanges, a portion of the strap beyond said strands being hooked in a T-slot for retaining the strap in tensioned engagement with said strands.

10. A strand-retainer for use in combination with an elastic binding strap, said retainer comprising opposed channel-shaped strand-receiving portions each having upper and lower flanges and an intermediate web, snap fastener means formed as a continuation of the web and extending below said channel-receiving portions, said web being formed with means for attachment of one end of the elastic strap thereto, and said retainer having a strap-receiving opening in another part thereof to receive an intermediate portion of said strap after the latter has been stretched to embrace and hold in place a plurality of strands grouped in one of said channels.

11. A strand-retainer for use in combination with an elastic binding strap, said retainer comprising opposed channel-shaped strand-receiving portions having upper and lower flanges and an intermediate web portion, snap fastener means formed as a continuation of the web and extending beyond the channel-receiving portion, each of said web portions being formed with an elongated slot for receiving an end of the elastic strap for attachment of the strap thereto, and at least one of the upper flanges being formed with a strap-receiving opening to receive an intermediate portion of the strap after the latter has been stretched to embrace and hold in place a plurality of strands grouped in one of said channels.

12. A strand-retainer for use in combination with an elastic binding strap, said retainer formed of a single piece of sheet metal bent intermediate its ends to provide a U-shaped snap fastener means for attaching said retainer to a support, a strand-receiving channel connected to at least one leg of said U-shaped fastener means, said strand-receiving channel comprising a web portion formed as a continuation of said fastener leg and an upper flange portion extending angularly thereto, a base flange extending angularly from said web on opposite sides of said fastener leg, said strand-receiving channel being adapted to receive a plurality of strands therein, and said retainer being formed with means for anchoring one end of the elastic strap thereto and a spaced opening to receive an intermediate portion of said strap after said strap has been stretched into tensioned engagement with the strands grouped in said channel.

13. A strand-retainer for use in combination with an elastic binding strap formed of a single piece of sheet metal bent intermediate its ends to provide a U-shaped snap fastener means for attaching said retainer to an apertured support, a strand-receiving channel connected to at least one leg of said U-shaped fastener means, said receiving channel comprising a web portion formed as a continuation of said fastener leg and an upper flange portion extending angularly thereto, a base flange extending angularly from said web on opposite sides of said fastener leg, said strand-receiving channel being adapted to receive a plurality of strands therein, said upper flange being formed with a T-slot near its outer edge, and means in said channel spaced from said T-slot for receiving and anchoring one end of the elastic strap thereto, said construction permitting an intermediate portion of said strap to be hooked in said T-slot after it has been stretched to engage under tension said grouped strands in said channel.

14. A strand-retainer for use in combination with an elastic binding strap formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said upper flanges being formed with T-slots near their terminal edges, the web slots providing anchoring openings for one end of the elastic strap, the intermediate portion of which is adapted to embrace a plurality of strands grouped in at least one of said channels and a portion therebeyond hooked into a T-slot for retaining the strap in tensioned engagement with said strands.

15. A strand-retainer for use in combination with an elastic binding strap formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said base flanges engaging said support at their ends and cooperating with said U-shaped fastener means to securely hold said retainer in position on said support, said web portions being formed with aligned slots and said upper flanges being formed with T-slots near their terminal edges, the web slots providing anchoring openings for one end of the elastic strap, the intermediate portion of the strap being adapted to embrace a plurality of strands grouped in at least one of said channels and a portion therebeyond hooked into said T-slot for retaining the strap in tensioned engagement with said strands.

16. A strand-retainer for use in combination with an elastic binding strap formed of a single piece of sheet material bent intermediate its ends to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said web portions being formed with aligned slots, and said upper flanges being formed with T-slots near their terminal edges, the web slots providing anchoring openings for one end of the elastic strap, the intermediate portion of the strap being adapted to embrace a plurality of strands grouped in at least one of said channels and a portion therebeyond hooked into said T-slot for retaining the strap in tensioned engagement with said strands.

17. A strand-retainer for use in combination with an elastic binding strap formed of a single piece of sheet material bent intermediate its end to form a U-shaped snap fastener attaching means for attaching said retainer to an apertured support, a strand-receiving channel connected to each of the legs of said U-shaped attaching means and each including a web portion formed as continuations of the legs of said U, each of said channels also comprising upper and base flanges extending angularly to their respective web portions, said web portions being formed with aligned slots, and said upper flanges being formed with T-slots near their terminal edges, the web slots providing anchoring openings for one end of said strap the intermediate portion of which is adapted to embrace a plurality of strands grouped in at least one of said channels and on the outer surface of said upper flanges, and a portion of the strap beyond said strands being adapted to be hooked in a T-slot for retaining the strap in tensioned engagement with said strands.

HOWARD J. MURPHY.